United States Patent
Schmitt et al.

(10) Patent No.: US 7,488,810 B2
(45) Date of Patent: Feb. 10, 2009

(54) METHOD FOR PRODUCING A LIQUID FORMULATION OF SALTS OF SULFOACIDIC AZO DYES

(75) Inventors: Michael Schmitt, Worms (DE); Helmut Reichelt, Neustadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 628 days.

(21) Appl. No.: 10/534,057

(22) PCT Filed: Nov. 17, 2003

(86) PCT No.: PCT/EP03/12803

§ 371 (c)(1), (2), (4) Date: May 6, 2005

(87) PCT Pub. No.: WO2004/048478

PCT Pub. Date: Jun. 10, 2004

(65) Prior Publication Data

US 2006/0052590 A1    Mar. 9, 2006

(30) Foreign Application Priority Data

Nov. 28, 2002   (EP)   ................... 02026581

(51) Int. Cl.
  *C09B 35/52*   (2006.01)
  *C09B 67/26*   (2006.01)

(52) U.S. Cl. ...................... 534/582; 534/679

(58) Field of Classification Search .................. 534/679
See application file for complete search history.

(56) References Cited

U.S. PATENT DOCUMENTS

| 384,315 A | 6/1888 | Herzberg |
| 384,316 A * | 6/1888 | Herzberg ........................ 8/641 |
| 2,022,606 A | 11/1935 | Smith et al. |
| 4,400,321 A | 8/1983 | Linhart et al. |
| 4,701,525 A | 10/1987 | Rohr et al. |
| 4,952,680 A * | 8/1990 | Schmeidl .................... 534/676 |

FOREIGN PATENT DOCUMENTS

| BE | 631 379 | 8/1963 |
| DE | 46804 | 11/1887 |
| DE | 46 804 | 2/1889 |
| DE | 30 11 235 | 10/1981 |
| EP | 0 045 840 | 2/1982 |
| EP | 0 169 808 | 1/1986 |
| JP | 61-296069 | 12/1986 |

OTHER PUBLICATIONS

Dr. Hans Eduard Fierz-David, et al., "Grundlegende Operationen der Farbenchemie", 6$^{th}$ Edition, Published by "Springer Verlag", Wien 1946, pp. 33, 37-39, 246, 247, 267 and 268.
Prof. Dr. Jurgen Falbe Dusseldorf, et al., "ROMPP Chemie Lexikon", 1989, 9$^{TH}$ Edition p. 4810 topic, "Umkristallisation".
Prof. Dr. Jurgen Falbe Dusseldorf, et al., "ROMPP Chemie Lexikon", 1989, 9$^{TH}$ Edition pp. 307-309 topic, "Ausfalle" and Aussalzen.
"Fachlexikon ABC Chemie", vol. 1 A-K, Edition 1987, Published by the Harris Deutsch, Thun and Frankfurt/Main p. 374.
Color Index, 3$^{rd}$ Edition, vol. 4, Published by the Society of Dyers and Colourists, 1971, England.

* cited by examiner

*Primary Examiner*—Fiona T Powers
(74) *Attorney, Agent, or Firm*—Oblon, Spivak, McClelland, Maier & Neustadt, P.C.

(57) ABSTRACT

A process for preparing a liquid formulation of salts of sulfonated azo dyes, comprising a) preparing vesuvin from m-phenylenediamine; b) without interveningly isolating the vesuvin coupling an at least equimolar amount of diazotized aminoarylsulfonic acids I $$H_2N-Ar-SO_3H \qquad (I),$$

where Ar is phenylene (which may be monosubstituted by sulfo) or naphthalene (which may be mono- or disubstituted by sulfo and/or monosubstituted by hydroxyl) onto vesuvin and c) isolating the dyes in their acid form and subsequently dissolving them in aqueous bases.

12 Claims, No Drawings

METHOD FOR PRODUCING A LIQUID FORMULATION OF SALTS OF SULFOACIDIC AZO DYES

The present invention relates to a process for preparing a liquid formulation of salts of sulfonated azo dyes.

Vesuvin and its coupling products such as C.I. Direct Brown 44 have been known since the beginnings of dyestuff chemistry. For instance, the Colour Index shows that C.I. Direct Brown 44 is obtained by formally coupling two parts of sulfanilic acid onto one part of vesuvin (Bismarck Brown C.I. 21000). The cited German patent 46804 teaches the reaction of vesuvin with sulfanilic acid. However, the product is contaminated with large amounts of vesuvin, which have to be removed by filtration. The dye is recovered from the aqueous solution by salting out. However, the dye obtained by salting out is not suitable for preparing liquid formulations, since its salt burden is much too high. Moreover, such isolating steps are very costly and inconvenient.

JP 61 296 069 teaches preparing the lithium salt of Direct Brown 44 by starting from the sodium salt, precipitating the acid and then using lithium hydroxide to prepare the lithium salt.

It is an object of the present invention to provide a process for preparing a low-salt and low-vesuvin liquid formulation of the dye. The process shall further have a good space-time yield and give rise to very little wastewater.

We have found that this object is achieved by a process for preparing a liquid formulation of salts of sulfonated azo dyes, comprising a) preparing vesuvin from m-phenylenediamine; b) without interveningly isolating the vesuvin coupling an at least equimolar amount of diazotized aminoarylsulfonic acids I

$$H_2N\text{---}Ar\text{---}SO_3H \qquad (I),$$

where Ar is phenylene (which may be monosubstituted by sulfo) or naphthalene (which may be mono- or disubstituted by sulfo and/or monosubstituted by hydroxyl) onto vesuvin and c) isolating the dyes in their acid form and subsequently dissolving them in aqueous bases. Useful diazo components I include aminoarylsulfonic acids such as o-, m- and p-aminobenzenesulfonic acids, 1-aminobenzene-3,5-disulfonic acid, 1-aminobenzene-2,4-disulfonic acid, 1-aminobenzene-2,5-disulfonic acid, 1-naphthylamine-2-sulfonic acid, 1-naphthylamine-3-sulfonic acid, 1-naphthylamine-4-sulfonic acid, 1-naphthylamine-5-sulfonic acid, 1-naphthylamine-6-sulfonic acid, 1-naphthylamine-7-sulfonic acid, 1-naphthylamine-8-sulfonic acid, 1-naphthylamine-3,6-disulfonic acid, 1-naphthylamine-3,8-disulfonic acid, 1-naphthylamine-4,7-disulfonic acid, 1-amino-8-hydroxynaphthalene-4,6-disulfonic acid, 1-amino-8-hydroxynaphthalene-4-sulfonic acid, 1-amino-8-hydroxynaphthalene-3,6-disulfonic acid, 2-aminonaphthalene-1-sulfonic acid, 2-naphthylamine-5-sulfonic acid, 2-naphthylamine-6-sulfonic acid, 2-naphthylamine-7-sulfonic acid, 2-aminonaphthalene-8-sulfonic acid, 2-naphthylamine-1,5-disulfonic acid, 2-naphthylamine-3,6-disulfonic acid, 2-naphthylamine-4,8-disulfonic acid, 2-naphthylamine-5,7-disulfonic acid, 2-naphthylamine-6,8-disulfonic acid, 2-naphthylamine-3,6-disulfonic acid, 2-naphthylamine-5,7-disulfonic acid, 2-naphthylamine-3,6,8-trisulfonic acid, 2-amino-8-hydroxynaphthalene-6-sulfonic acid, 2-amino-5-hydroxynaphthalene-7-sulfonic acid, 2-amino-3-hydroxynaphthalene-6-sulfonic acid and 2-amino-5-hydroxynaphthalene-1,7-disulfonic acid.

Preference is given to aminoarylsulfonic acids where Ar is phenylene or naphthylene which may each be substituted by a sulfo group. Particular preference is given to o-, m- and p-aminobenzenesulfonic acids, especially sulfanilic acid (p-aminobenzenesulfonic acid).

The aminoarylsulfonic acids I are diazotized using customary diazotizing agents such as nitrous acid, which is formed from alkali metal nitrite under acidic conditions. Useful diazotizing agents further include nitrosylsulfuric acid and alkyl nitrite, especially neopentylglycol dinitrite.

After excess nitrite has been destroyed, for example with sulfamic acid, the reaction mixture containing the diazonium salt is added to the generally aqueous solution of vesuvin. The coupling reaction is preferably carried out in the pH range from 4 to 8 and more preferably in the pH range from 5 to 6.

The pH for the coupling reaction is set using agents known to one skilled in the art. Useful bases include for example basic metal hydroxides such as aqueous sodium hydroxide solution, basic metal carbonates such as sodium carbonate, sodium bicarbonates, or sodium dihydrogenphosphates, amines such as ethanolamine or alkali metal salts of carboxylic acids such as sodium acetate, lithium acetate, potassium acetate, sodium formate, sodium propionate, sodium oxalate, sodium succinate, sodium glutamate, sodium adipate, sodium glycolate, sodium lactate, sodium malate, sodium citrate, sodium tartrate, sodium fumarate or sodium maleate.

The diazo components I may be used individually or in their mixtures. The use of mixtures gives rise to dye mixtures which contain asymmetrically substituted dyes as well. A preferred version of the process does not utilize diazo component mixtures. Formally, a dimolar coupling of a diazo component I onto vesuvin will produce a symmetrical dye. In general, however, a mixture is obtained that contains the single, double, triple and quadruple coupling products.

The amount of diazo component used per one mole of coupling component is preferably in the range from 1 to 4, more preferably in the range from 1.5 to 2.5 and especially in the range from 1.8 to 2.2 mol. A vesuvin content of <10% by weight in the product mixture may thus generally be achieved.

The coupling reaction is generally carried out in the temperature range from 0 to 20° C. To complete the reaction, it is preferable to warm to temperatures in the range from 20 to 30° C.

According to the invention, the sulfonated azo dye is isolated in its acid form. This is accomplished by acidifying the mixtures after the coupling reaction has taken place. The pH set is preferably in the range from 0 to 4.5 and more preferably in the range from 0 to 2. In a particularly preferred version of the process, the pH is lowered stepwise. This can be accomplished by adding the acid in two or more portions over a period from 15 to 45 minutes. It is similarly possible to meter the acid in plural portions or even continuously.

In a further preferred version of the process, it is advantageous for the acid of the sulfonated azo dye to be crystallized at from 20 to 70° C.

This affords the acid of the sulfonated azo dye as a solid, which can be isolated in a generally customary manner as by filtration or centrifugation. This is a simple way of ridding the azo dye of its salt burden. The dye obtained is preferably washed with water until the salt content is <5% by weight, preferably <2% by weight.

The sulfonated azo dye is subsequently dissolved in dilute bases. The choice of base dictates which salt of the dye is obtained. The sodium and/or ammonium salts are particularly preferred.

Suitable salts include metal or ammonium salts. Metal salts are in particular the lithium, sodium or potassium salts. Ammonium salts for the purposes of the present invention are salts which contain either substituted or unsubstituted ammonium cations. Examples of substituted ammonium cations are monoalkyl-, dialkyl-, trialkyl-, tetraalkyl- or benzyltrialkyl-ammonium cations or such cations as derive from nitrogenous five- or six-membered saturated heterocycles, such as pyrrolidinium, piperidinium, morpholinium or piperazinium cations or their N-monoalkyl- or N,N-dialkyl-substituted products. Alkyl here is to be understood in the general sense as meaning straight-chain or branched $C_1$-$C_{20}$-alkyl, which may be substituted by one or two hydroxyl groups and/or interrupted by from one to four oxygen atoms in ether function. In general, lithium, sodium, potassium salts or $NH_4^+$ salts or their mixture are prepared.

In a particularly preferred version of the process, vesuvin is prepared from m-phenylenediamine and reacted without intervening isolation to form the sulfonated azo dye.

The vesuvin is prepared in a generally known manner by formally tetrazotizing one of three parts of m-phenylenediamine and allowing the remaining two parts to couple. To this end, 3 mol of m-phenylenediamine are reacted with from 1.5 to 2.5 mol, and preferably from 1.8 to 2.2 mol of sodium nitrite under acidic conditions. Preference is given to a process in which the acid is metered over a prolonged period, for example from 30 to 60 and preferably from 40 to 50 minutes. To complete the reaction, the pH of the reaction mixture is adjusted to a value in the range from 2 to 4, and the reaction mixture is subsequently stirred for some time. The entire reaction to give vesuvin is carried out at from −5 to +25° C. and preferably at from 0 to 15° C. On completion of addition of nitrite, the reaction mixture is stirred for a period in the range from 0.5 to 4 hours. The reaction mixture can then have the diazonium salt of the aminoarylsulfonic acid I metered into it directly.

The aqueous salt solution of the sulfonated azo dye can be directly used for liquid formulations.

If desired, the dye solutions are admixed with solubilizing additives. In this case, either its solution or the solid itself is admixed with solubilizing additives. Such additives include for example water-miscible organic solvents such as $C_1$-$C_4$-alkanols, for example methanol, ethanol, propanol, isopropanol, butanol, isobutanol, sec-butanol or tert-butanol, carboxamides, such as N,N-dimethylformamide or N,N-dimethylacetamide, ketones or keto alcohols, such as acetone, methyl ethyl ketone or 2-methyl-2-hydroxypentan-4-one, ethers, such as tetrahydrofuran or dioxane, mono-, oligo- or polyalkylene glycols or thioglycols having $C_2$-$C_6$-alkylene units, such as ethylene glycol, 1,2-propylene glycol or 1,3-propylene glycol, 1,2-butylene glycol or 1,4-butylene glycol, neopentylglycol, 1,6-hexanediol, diethylene glycol, triethylene glycol, dipropylene glycol, thiodiglycol, polyethylene glycol or polypropylene glycol, other polyols, such as glycerol or 1,2,6-hexanetriol, $C_1$-$C_4$-alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyldiglycol) or triethylene glycol monomethyl or monoethyl ether, $C_1$-$C_4$-alkyl esters of polyhydric alcohols, γ-butyrolactone or dimethyl sulfoxide. Useful solubilizing additives further include lactams, such as caprolactam, 2-pyrrolidinone or N-methyl-2-pyrrolidinone, urea, cyclic ureas, such as 1,3-dimethylimidazolidin-2-one or 1,3-dimethylhexahydropyrimid-2-one and also polyacrylic acids, polyacrylic acid derivatives, polyvinylamines, polyvinylamides, polyvinyl acetates, polyvinyl alcohols, polyvinylpyrrolidones, polysiloxanes or copolymers of the respective monomers. It is similarly possible to use oligomers of ethyleneimine, of ethylene oxide or of propylene oxide or derivatives of these oligomers.

Preferred solubilizing additives are ureas, mono-, di- or triethanolamine, caprolactam, mono-, di- or trialkylene glycols having $C_2$-$C_5$-alkylene units and/or oligo- and polyalkylene glycols having ethylene and/or propylene units and also their $C_1$-$C_4$-alkyl ethers and $C_1$-$C_4$-alkyl esters. Very particular preference is given to ethylene glycol, 1,2-propylene glycol, 1,3-propylene glycol, neopentylglycol, butyldiglycol, alkylpolyethylene glycols, (MW 200-500), ureas and caprolactam.

Preferred liquid brands contain essentially
15-30% by weight of sulfonated azo dyes (based on the dye without counterion)
0-30% by weight of solubilizing additives based on the total amount of the aqueous liquid brand. Particular preference is given to liquid brands which contain essentially from 15% to 30% by weight of sulfonated azo dyes and from. 1% to 30% by weight and preferably from 1% to 5% by weight of solubilizing additives specifically ethylene glycol, 1,2-propylene glycol, 1,3-propylene glycol, neopentylglycol, butyldiglycol, alkylpolyethylene glycols (MW 200-500), ureas and/or caprolactam. These liquid brands are notable for excellent stability in storage. The liquid brands are useful inter alia for dyeing and printing cellulosic fiber materials such as wood-containing and wood-free paper materials.

The process according to the present invention provides ready-for-sale liquid formulations of sulfonated azo dyes that enable dyebaths to be prepared directly, simply by diluting with water. The liquid formulations have a low salt content. The process according to the present invention makes it possible to prepare liquid formulations of salts of sulfonated tetraazo dyes in good space-time yield and high stability at from 4 to 50° C.

The examples which follow illustrate the invention. Parts are by weight, unless otherwise mentioned.

EXAMPLES

Example 1

173 parts of Vesuvin Base are stirred into 2500 parts of ice-water. To prepare the diazo component, 1300 parts of water and 157 parts of 25% by weight aqueous sodium hydroxide solution were introduced as an initial charge, and 170 parts of sulfanilic acid dissolved therein. 1300 parts of ice and 335 parts of 23% by volume of sodium nitrite solution were added to the sulfanilic acid solution, and 447 parts of 20% hydrochloric acid were added for diazotization. After a short period of further stirring, excess nitrite was destroyed by addition of sulfamic acid.

The diazo component was added to the coupling component before a pH of 5.0-6 was set with aqueous sodium hydroxide solution. After the coupling reaction had ended, pH 1 was set with hydrochloric acid. The solid dye was filtered off, washed salt free with water and dried. 360 g of dye were obtained minus 1.5% by weight of NaCl. The vesuvin content was 12% by weight based on the dye.

Example 2

20 parts of the dye obtained according to Example 1, as a moist presscake, were dissolved together with 5 parts of 1,2-propanediol and 72 parts of dilute aqueous sodium hydroxide solution at pH 10-12.

After clarifying filtration, the dye solution was used directly for paper dyeing.

General experimental prescription for examples 3-7:

To prepare the coupling components, 163 parts of m-phenylenediamine were introduced as an initial charge as a solution in 900 parts of water and 45 parts of 20% hydrochloric acid at room temperature. 1300 parts of ice were added. 76 parts of solid sodium nitrite were then added with stirring. 395 parts of 20% hydrochloric acid were metered in over 40-50 minutes, which was followed by stirring to complete the reaction. pH 3 was set with 25% by weight aqueous sodium hydroxide solution, which was followed by stirring at 3° C. for one hour.

To prepare the diazo component, 1300 parts of water and 157 parts of 25% by weight aqueous sodium hydroxide solution were introduced as an initial charge, and X parts of sulfanilic acid were dissolved therein. 1300 parts of ice and Y parts of sodium nitrite solution (23% by volume) were added to the sulfanilic acid solution, before 447 parts of 20% hydrochloric acid were added for diazotization. After a short period of subsequent stirring, excess nitrite was destroyed by addition of sulfamic acid.

The diazo component was added to the coupling component, and a pH of 5.0-6 was set with aqueous sodium hydroxide solution. After the coupling reaction had ended, pH 1 was set with hydrochloric acid and the solid dye was filtered off, washed salt free with water and dried.

Example 3

The dye was prepared according to the general experimental prescription using 144 parts of sulfanilic acid (X) and 283 parts of nitrite solution (Y). This gave 332 g of dye minus 0.84% by weight of NaCl. The vesuvin content was 15% by weight based on the dye.

Example 4

The dye was prepared according to the general experimental prescription using 170 parts of sulfanilic acid (X) and 335 parts of nitrite solution (Y). This gave 350 g of dye minus 0.46% by weight of NaCl. The vesuvin content was 12% by weight based on the dye.

Example 5

The dye was prepared according to the general experimental prescription using 183 parts of sulfanilic acid (X) and 361 parts of nitrite solution (Y). This gave 390 g of dye minus 1.3% by weight of NaCl. The vesuvin content was 10% by weight based on the dye.

Example 6

The dye was prepared according to the general experimental prescription using 170 parts of sulfanilic acid (X) and 344 parts of nitrite solution (Y). This gave 347 g of dye minus 1.3% by weight of NaCl. The vesuvin content was 6.8% by weight based on the dye.

Example 7

The dye was prepared according to the general experimental prescription using 177 parts of sulfanilic acid (X) and 357 parts of nitrite solution (Y). This gave 352 g of dye minus 0.16% by weight of NaCl. The vesuvin content was 5.8% by weight based on the dye.

Example 8

20 parts of the dye obtained according to Examples 3 to 7, as a moist presscake, were dissolved together with 5 parts of 1,2-propanediol and 75 parts of dilute aqueous sodium hydroxide solution at pH 10-12. After clarifying filtration, the dye solution was used directly for paper dyeing.

Example 9

20 parts of the dye obtained according to Examples 3 to 7, as a moist presscake, were dissolved together with 5 parts of 1,2-propanediol and 75 parts of dilute aqueous ammonia solution at pH 9-10. After clarifying filtration, the dye solution was used directly for paper dyeing.

Example 10

23 parts (reckoned 100%) of the dye obtained according to Examples 3 to 7, as a moist presscake, were dissolved together with 5 parts of neopentylglycol in 72 parts of a mixture of dilute aqueous sodium hydroxide solution and 25% ammonia at pH 9-10 (this formally gives the 1/1 sodium/ammonium salt). After clarifying filtration, the dye solution was used directly for paper dyeing.

Example 11

23 parts (reckoned 100%) of the dye obtained according to Examples 3 to 7, as a moist presscake, were dissolved together with 1 part of ethylpolyethylene glycol (MW 400) in 76 parts of a mixture of dilute aqueous sodium hydroxide solution and 25% ammonia at pH 9-10 (this formally gives the 1/1 sodium/ammonium salt). After clarifying filtration, the dye solution was used directly for paper dyeing.

Example 12

21 parts (reckoned 100%) of the dye obtained according to Examples 3 to 7, as a moist presscake, were dissolved together with 5 parts of ethylpolyethylene glycol (MW 200) in 74 parts of a mixture of dilute aqueous sodium hydroxide solution and 25% ammonia at pH 9-10 (this formally gives the 1/1 sodium/ammonium salt). After clarifying filtration, the dye solution was used directly for paper dyeing.

Example 13

23 parts (reckoned 100%) of the dye obtained according to Examples 3 to 7, as a moist presscake, were dissolved together with 2.5 parts of urea in 74.5 parts of a mixture of dilute aqueous sodium hydroxide solution and 25% ammonia at pH 9-10 (this formally gives the 1/1 sodium/ammonium salt). After clarifying filtration, the dye solution was used directly for paper dyeing.

The invention claimed is:

1. A process for preparing a liquid formulation of salts of sulfonated azo dye compounds, comprising
    preparing vesuvin from m-phenylenediamine;
    reacting at least an equimolar amount of at least one diazotized aminoarylsulfonic acid with vesuvin to form at least two dye compounds;
    isolating the dye compounds in their acid form; and
    dissolving the dye compounds in at least one aqueous base;
    wherein the reaction is performed without isolating the vesuvin, wherein the aminoarylsulfonic acid has the formula:

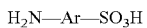
H₂N—Ar—SO₃H wherein Ar is phenylene.

2. The process of claim 1, wherein the aminoarylsulfonic acid is substituted with an additional sulfonic acid group.

3. A process for preparing a liquid formulation of salts of sulfonated azo dye compounds, comprising
preparing vesuvin from m-phenylenediamine;
reacting at least an equimolar amount of at least one diazotized aminoarylsulfonic acid with vesuvin to form at least two dye compounds;
isolating the dye compounds in their acid form; and
dissolving the dye compounds in at least one aqueous base;
wherein the reaction is performed without isolating the vesuvin,
wherein the aminoarylsulfonic acid has the formula:

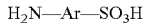
H₂N—Ar—SO₃H wherein Ar is naphthalene, and
wherein the aminoarylsulfonic acid is substituted with two additional sulfonic acid groups.

4. A process for preparing a liquid formulation of salts of sulfonated azo dye compounds, comprising
preparing vesuvin from m-phenylenediamine;
reacting at least an equimolar amount of at least one diazotized aminoarylsulfonic acid with vesuvin to form at least two dye compounds;
isolating the dye compounds in their acid form; and
dissolving the dye compounds in at least one aqueous base;
wherein the reaction is performed without isolating the vesuvin,
wherein the aminoarylsulfonic acid has the formula:

H₂N—Ar—SO₃H wherein Ar is naphthalene, and
wherein the aminoarylsulfonic acid is substituted with a hydroxyl group.

5. A process for preparing a liquid formulation of salts of sulfonated azo dye compounds, comprising
preparing vesuvin from m-phenylenediamine;
reacting at least an equimolar amount of at least one diazotized aminoarylsulfonic acid with vesuvin to form at least two dye compounds;
isolating the dye compounds in their acid form; and
dissolving the dye compounds in at least one aqueous base;
wherein the reaction is performed without isolating the vesuvin,
wherein the aminoarylsulfonic acid has the formula:

H₂N—Ar—SO₃H wherein Ar is naphthalene,
wherein the aminoarylsulfonic acid is substituted with an additional sulfonic acid group, and
wherein the aminoarylsulfonic acid is additionally substituted with a hydroxyl group.

6. The process of claim 3, wherein the aminoarylsulfonic acid is additionally substituted with a hydroxyl group.

7. The process of claim 1, wherein the azo dye compounds are prepared from an o-aminobenzenesulfonic acid diazo component, a m-aminobenzenesulfonic acid diazo component, a p-aminobenzenesulfonic acid diazo component, or a combination thereof.

8. The process as claimed in claim 1, wherein the vesuvin and the at least one diazotized aminoarylsulfonic acid are used in a stoichiometric ratio ranging from 1:1 to 1:4.

9. The process of claim 1, wherein the reaction of at least one diazotized aminoarylsulfonic acid with vesuvin is carried out at a pH ranging from 4 to 8.

10. The process of claim 1, wherein the at least two dye compounds are isolated by adjusting the pH to a value ranging from 0 to 4.5.

11. The process of claim 1, wherein the at least two dye compounds are crystallized by stepwise acidification.

12. The process of claim 1, wherein the at least two dye compounds are crystallized at a temperature ranging from 20 to 70° C.

* * * * *